US012727012B2

(12) United States Patent
Lin

(10) Patent No.: US 12,727,012 B2
(45) Date of Patent: Sep. 1, 2026

(54) METHOD AND APPARATUS FOR SIDELINK RESOURCE RE-ASSESSMENT AND UE

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 268 days.

(21) Appl. No.: 18/630,752

(22) Filed: Apr. 9, 2024

(65) Prior Publication Data

US 2024/0260067 A1 Aug. 1, 2024

Related U.S. Application Data

(63) Continuation of application No. PCT/CN2022/127695, filed on Oct. 26, 2022.

(60) Provisional application No. 63/263,649, filed on Nov. 5, 2021.

(51) Int. Cl.
*H04W 72/40* (2023.01)
*H04W 72/0446* (2023.01)
*H04W 72/25* (2023.01)

(52) U.S. Cl.
CPC ....... *H04W 72/40* (2023.01); *H04W 72/0446* (2013.01); *H04W 72/25* (2023.01)

(58) Field of Classification Search
CPC . H04W 72/40; H04W 72/0446; H04W 72/25; H04W 72/02
See application file for complete search history.

(56) References Cited

U.S. PATENT DOCUMENTS

2023/0337187 A1* 10/2023 Ye .................... H04W 52/0216
2024/0260131 A1* 8/2024 Yue .................. H04W 52/0216
2024/0406978 A1* 12/2024 Zhou .................. H04B 17/328

FOREIGN PATENT DOCUMENTS

CN 112512008 A 3/2021

OTHER PUBLICATIONS

International Search Report in the international application No. PCT/CN2022/127695, mailed on Dec. 27, 2022. 4 pages.
Written Opinion of the International Search Authority in the international application No. PCT/CN2022/127695, mailed on Dec. 27, 2022. 4 pages.
3GPP TSG RAN WG1 #106-e R1-2107223, e-Meeting, Aug. 16-27, 2021, Source: OPPO, Title: Discussion on power saving in NR sidelink communication, Agenda Item: 8.11.1.1, Document for: Discussion and Decision. chapters 1-3. 23 pages.

(Continued)

*Primary Examiner* — Jung H Park
(74) *Attorney, Agent, or Firm* — Ladas & Parry LLP

(57) ABSTRACT

A method and apparatus for sidelink resource re-assessment and a UE are provided. The method includes that: the UE determines at least one of a pre-selected sidelink resource or a reserved sidelink resource for periodic sidelink transmission; and the UE performs at least one of re-evaluation of the pre-selected sidelink resource or pre-emption checking of the reserved sidelink resource based on sensing results of at least one of Periodic-based Partial Sensing or Contiguous Partial Sensing. The periodic sidelink transmission is defined by a resource reservation interval set to non-zero.

20 Claims, 4 Drawing Sheets

(56) References Cited

OTHER PUBLICATIONS

3GPP TSG RAN WG1 #106bis-e R1-2110478, e-Meeting, Oct. 11-19, 2021, Source: Moderator (OPPO), Title: FL summary for Al 8.11.1.1—resource allocation for power saving (before 2nd GTW), Agenda item: 8.11.1.1, Document for: Discussion and Decision. chapters 1-4. 88 pages.

3GPP TSG RAN WG1 #106bis-e R1-2110479, e-Meeting, Oct. 11-19, 2021, Source: Moderator (OPPO), Title: FL summary for Al 8.11.1.1—resource allocation for power saving (before 4th GTW), Agenda item: 8.11.1.1, Document for: Discussion and Decision. chapters 1-4. 114 pages.

3GPP TSG RAN WG1 #106bis-e R1-2110480, e-Meeting, Oct. 11-19, 2021, Source: Moderator (OPPO), Title: FL summary for Al 8.11.1.1—resource allocation for power saving (EOM), Agenda item: 8.11.1.1, Document for: Discussion and Decision. chapters 1-4. 115 pages.

* cited by examiner

METHOD AND APPARATUS FOR SIDELINK RESOURCE RE-ASSESSMENT AND UE

CROSS-REFERENCE TO RELATED APPLICATIONS

The present disclosure is a US continuation application of International Application No. PCT/CN2022/127695 filed on Oct. 26, 2022, which claims priority and rights to U.S. Provisional Application No. 63/263,649 filed on Nov. 5, 2021. The disclosures of the above applications are incorporated by reference herein in their entirety.

BACKGROUND

On the one hand, for a UE operating in a power saving mode, there is a risk of causing transmission collision due to limited resource sensing or no sensing at all. On the other hand, those indicated or reserved resources from other UEs after the UE performed an initial resource selection also increase the risk of transmission collision for the UE.

SUMMARY

Embodiments of the present disclosure relate to the field of mobile communication technologies, and more particularly to a method and apparatus for sidelink resource re-assessment and User Equipment (UE).

The embodiments of the present disclosure provide a method and apparatus for sidelink resource re-assessment, a UE, a chip, a computer-readable storage medium, a computer program product, and a computer program.

An embedment of the present disclosure provides a method for sidelink resource re-assessment, which includes the following operations.

A UE determines at least one of a pre-selected sidelink resource or a reserved sidelink resource for periodic sidelink transmission.

The UE performs at least one of re-evaluation of the pre-selected sidelink resource or pre-emption checking of the reserved sidelink resource based on sensing results of at least one of Periodic-based Partial Sensing (PBPS) or Contiguous Partial Sensing (CPS).

Here, the periodic sidelink transmission is defined by a resource reservation interval set to non-zero.

An embedment of the present disclosure provides an apparatus for sidelink resource re-assessment, applied to a UE. The apparatus includes a determination unit and a re-assessment unit.

The determination unit is configured to determine at least one of a pre-selected sidelink resource or a reserved sidelink resource for periodic sidelink transmission.

The re-assessment unit is configured to perform at least one of re-evaluation of the pre-selected sidelink resource or pre-emption checking of the reserved sidelink resource based on sensing results of at least one of Periodic-based Partial Sensing (PBPS) or Contiguous Partial Sensing (CPS).

Here, the periodic sidelink transmission is defined by a resource reservation interval set to non-zero.

An embedment of the present disclosure provides a UE, which includes a processor and a memory. The memory is configured to store a computer program, and the processor is configured to call and execute the computer program stored in the memory to perform the above-mentioned method for sidelink resource re-assessment.

An embedment of the present disclosure provides a chip for implementing the afore-mentioned method for sidelink resource re-assessment.

Specifically, the chip includes a processor, configured to call and execute a computer program stored in a memory to cause a device equipped with the chip to perform the above-mentioned method for sidelink resource re-assessment.

An embedment of the present disclosure provides a computer-readable storage medium, configured to store a computer program that, when executed, cause a computer to perform the above-mentioned method for sidelink resource re-assessment.

An embedment of the present disclosure provides a computer program product including computer program instructions that, when executed, cause a computer to perform the above-mentioned method for sidelink resource re-assessment.

An embedment of the present disclosure provides a computer program that, when executed by a computer, causes the computer to perform the above-mentioned method for sidelink resource re-assessment.

BRIEF DESCRIPTION OF THE DRAWINGS

The drawings illustrated herein are used to provide a further understanding of the present disclosure and constitute a part of the present disclosure. The exemplary embodiments of the present disclosure and the description thereof are used to explain the present disclosure and do not constitute an improper limitation of the present disclosure. In the drawings.

DETAILED DESCRIPTION

The technical solutions in the embodiments of the present disclosure will be described below with reference to the accompanying drawings in the embodiments of the present disclosure. It is obvious that the described embodiments are part of the embodiments of the present disclosure, but not all of the embodiments of the present disclosure. Based on the embodiments of the present disclosure, all other embodiments obtained by those of ordinary skill in the art without creative efforts fall within the scope of protection of the present disclosure.

According to the technical solutions in some embodiments of the present disclosure, the UE determines at least one of a pre-selected sidelink resource or a reserved sidelink resource, and performs at least one of re-evaluation of the pre-selected sidelink resource or pre-emption checking of the reserved sidelink resource based on sensing results of at least one of Periodic-based Partial Sensing (PBPS) or Contiguous Partial Sensing (CPS), where the periodic sidelink transmission is defined by a resource reservation interval set to non-zero. In such way, the transmission collisions can be minimized and avoided to improve the performance and reliability of sidelink communication.

Figure 1:
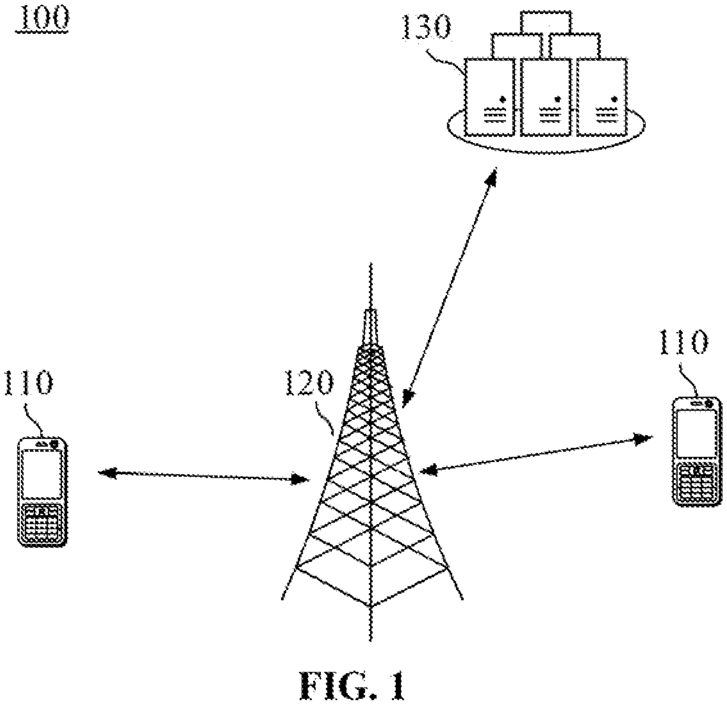
FIG. 1 is a schematic diagram of an application scenario provided by an embodiment of the present disclosure.

FIG. 1 is a schematic diagram of an application scenario provided by an embodiment of the present disclosure.

As illustrated in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that the embodiments of the present disclosure only use the communication system 100 for exemplary description, but the embodiments of the present disclosure are not limited thereto. That is to say, the technical solutions of the embodiments of the present application can be applied to various communication systems, such as a Long Term Evolution (LTE) system, an LTE Time Division Duplex (TDD) system, a Universal Mobile Telecommunication System (UMTS), an Internet of Things (IoT) system, a Narrow Band Internet of Things (NB-IoT) system, an Enhanced Machine-Type Communications (EMTC) system, a 5G communication system (also called New Radio (NR) communication system), or a future communication system.

In the communication system 100 illustrated in FIG. 1, the network device 120 may be an access network device that communicates with the terminal device 110. The access network device may provide communication coverage for a particular geographic region and may communicate with the terminal device 110 (e.g., a UE) in the coverage.

The network device 120 may be an evolved Node B (eNB or eNodeB) in the LTE system, a Next Generation Radio Access Network (NG RAN) device, a base station (gNB) in the NR system, or a wireless controller in a Cloud Radio Access Network (CRAN). Or the network device 120 may be a relay station, an access point, a Customer Premises Equipment (CPE), a vehicle device, a wearable device, a hub, a switch, a bridge, a router, or a network device in a future evolved Public Land Mobile Network (PLMN) or the like.

The terminal device 110 may be any terminal device including, but not limited to, a terminal device connected to the network device 120 or other terminal devices in a wired or wireless manner.

For example, the terminal device 110 may refer to an access terminal, a UE, a user unit, a user station, a mobile station, a mobile radio station, a remote station, a remote terminal, a mobile device, a user terminal, a terminal, a wireless communication device, a user agent or a user device or the like. The access terminal may be a cell phone, a cordless phone, a Session Initiation Protocol (SIP) phone, an IoT device, a satellite handheld terminal, a Wireless Local Loop (WLL) station, a Personal Digital Assistant (PDA), a Road Side Unit (RSU), a handheld device with a wireless communication function, a computing device, another processing device connected to a wireless modem, a vehicle-mounted device, a wearable device, a terminal device in the 5G network, or a terminal device in the future evolved PLMN or the like.

The terminal device 110 may perform Device to Device (D2D) communication with or without the presence or connection to a network device 120.

The communication system 100 may further include a core network device 130 that communicates with the base station. The core network device 130 may be a 5G Core (5GC) device, such as an Access and Mobility Management Function (AMF), an Authentication Server Function (AUSF), a User Plane Function (UPF), or a Session Management Function (SMF). Optionally, the core network device 130 may also be an Evolved Packet Core (EPC) device in the LTE network, such as a Session Management Function+Core Packet Gateway (SMF+PGW-C) device. It should be understood that SMF+PGW-C may simultaneously implement the functions that SMF and PGW-C are able to implement. In the process of network evolution, the above-mentioned core network device may also be called by other names, or a new network entity is formed by dividing the functions of the core network. There are no limits made thereto in the embodiments of the present disclosure.

The various functional units in the communication system 100 may also establish a connection through a Next Generation (NG) interface to implement communication.

For example, the terminal device may establish air interface connection with the access network device through an NR interface, for transmission of user plane data and control plane signaling. The terminal device may establish a control plane signaling connection with the AMF through an NG interface 1 (N1 for short). The access network device such as a next generation radio access base station (gNB) may establish a user plane data connection with the UPF through an NG interface 3 (N3 for short). The access network device may establish a control plane signaling connection with the AMF through an NG interface 2 (N2 for short). The UPF may establish a control plane signaling connection with the SMF through an NG interface 4 (N4 for short). The UPF may interact user plane data with a data network through an NG interface 6 (N6 for short). The AMF may establish a control plane signaling connection with the SMF through an NG interface 11 (N11 for short). The SMF may establish a control plane signaling connection with a Policy Control Function (PCF) through an NG Interface 7 (N7 for short).

A base station, a core network device and two terminal devices are exemplarily illustrated in FIG. 1. Optionally, the communication system 100 may include multiple base stations and another number of terminal devices may be included in coverage of each base station. There are no limits made thereto in the embodiments of the present disclosure.

It is to be noted that FIG. 1 only illustrates by way of example the system to which the present disclosure applies. It should be understood that the methods shown in the embodiments of the present disclosure may also be applicable to other systems. In addition, the terms "system" and "network" in the present disclosure may usually be exchanged in the present disclosure. In the present disclosure, the term "and/or" is only an association relationship describing associated objects and represents that three relationships may exist. For example, A and/or B may represent three situations: i.e., independent existence of A, existence of both A and B and independent existence of B. In addition, the character "/" in the present disclosure usually represents that previous and next associated objects form an "or" relationship. It should be understood that "indication/indicate/indicating" in the embodiments of the present disclosure may be a direct indication, or may be an indirect indication, or may be indicative of an association. For example, A indicates B, which may represent that A directly indicates B, e.g., B may be obtained through A; or which may represent that A indirectly indicates B, e.g., A indicates C, and B may be obtained through C; or which may represent that there is an association between A and B. It should be understood that "correspondence/correspond/corresponding” in the embodiments of the present disclosure may represent that there is a direct or indirect correspondence relationship between the two, or may represent that there is an association relationship between the two, or may be a relationship between indication and being indicated, configuration and being configured or the like. It should be understood that “predefined/preset” or “predefined/preset rules” in the embodiments of the present disclosure may be implemented by pre-storing, in the devices (e.g., including UEs and network devices), corresponding codes, tables, or other means for indicating relevant information, the specific implementation of which is not limited by the present disclosure. For example, “predefined” may refer to what is defined in the protocol. It should be understood that in the embodiments of the present disclosure, the “protocol” may refer to standard protocol(s) in the communication field, such as LTE protocol, the NR protocol, and related protocols applied in future communication systems, which are not limited in the present disclosure.

In order to facilitate the understanding of the technical solutions of the embodiments of the present disclosure, the technologies related to the embodiments of the present disclosure will be described below. In the following, the related technologies may be used as optional solutions and may be arbitrarily combined with the technical solutions of the embodiments of the present disclosure, and the solutions obtained through combination belong to the scope of protection of the embodiments of the present disclosure.

In supporting portable sidelink terminals/devices with limited supply of battery power (a.k.a. power constrained UE), e.g., vulnerable road users such as pedestrian UEs in Vehicle-to-Everything (V2X) communication and Augmented Reality (AR)/Virtual Reality (VR) glasses, the UE may operate in a power saving mode for sidelink (SL) communication to prolong its functioning time duration. When a sidelink UE is operating in the power saving mode, there are 3 main features by which the UE could use to reduce the power consumption of transmitting and receiving sidelink data information to/from other UEs, namely partial sensing, random resource selection and Sidelink-Discontinuous Reception (SL-DRX). In all of these power saving techniques, one common theme shared between them is to reduce the amount of UE listening/performing reception of Sidelink Control Information (SCI) and/or data transmitted from other UEs. For example, when a power saving UE transmits Packet Data Unit (PDU) or Transport Block (TB) using sidelink (over the PC5 interface), it can perform either partial sensing in which the UE monitors in limited number of slots based on a pre-defined rules and configured sensing occasions/length to determine availability of future resources, or random resource selection in which the UE does not monitor the SL channel and resource pool at all and selects a number of resources randomly for its own (re) transmission of a sidelink PDU/TB. In either approach, there is a risk of selecting a resource that has already been reserved by another UE and causing a transmission collision due to limited resource sensing or no sensing at all from the transmitter-UE (Tx-UE). For the case when SL-DRX is configured for the Tx-UE, the UE may skip data reception and resource sensing during the SL-DRX inactive timer, and thus, also increase the chance of transmission collision.

Furthermore, after the Tx-UE performed an initial selection of resources for (re)transmission of sidelink PDU(s)/TB(s), additional reservation/indication of resources could be made especially for high priority transmissions by other UEs operating in a same sidelink resource pool during the time gap between the initial selection of resources and the actual transmission of sidelink data. Similarly, the same could also occur during the time gap between the indication/reservation of future resources in Sidelink Control Information (SCI) from the Tx-UE and the actual transmission of sidelink data. For these cases, those indicated/reserved resources from other UEs after the Tx-UE’s initial resource selection also increase the risk of transmission collision for the Tx-UE.

As such, there is a need to minimize and to avoid transmission collisions for Tx-UEs operating in the power saving mode to improve the performance and reliability of sidelink communication. In order to ensure sidelink resources pre-selected and reserved by the Tx-UE have not been pre-empted or taken over by others operating in the same resource pool, in a method for sidelink resource re-assessment of the present disclosure, after the Tx-UE has performed the initial selection of resources for transmission, re-evaluation and/or pre-emption checking of the pre-selected and/or reserved sidelink resources is performed right before the actual transmission by the Tx-UE to ensure these sidelink resources are still available for use to avoid any potential collision. This is particular important for UEs that performed partial sensing on the sidelink channel/resource pool or random resource selection to further assess the availability, since the Tx-UE did not perform full sensing in every slot or any sensing in the past for the initial selection of resources.

In order to facilitate the understanding of the technical solutions of the embodiments of the present disclosure, the technical solutions of the present disclosure will be described in detail below with reference to the specific embodiments. The above related technologies may be used as optional solutions and may be arbitrarily combined with the technical solutions of the embodiments of the present disclosure, and the solutions obtained through combination belong to the scope of protection of the embodiments of the present disclosure. The embodiments of the present disclosure include at least part of the following contents.

It should be noted that the technical solutions of the embodiments of the present disclosure are applied to the following sidelink transmission scenario: periodic sidelink transmissions with a resource reservation periodicity set to none-zero.

It should be noted that UE(s) described in the technical solutions of the embodiments of the present disclosure especially refers to Tx-UE(s). The Tx-UE refers to a transmitter-end of sidelink transmission.

It should be noted that sidelink resource(s) described in the technical solutions of the embodiments of the present disclosure is used for periodic sidelink transmission, e.g., periodic transmission of sidelink MAC PDU(s)/TB(s).

Figure 2:
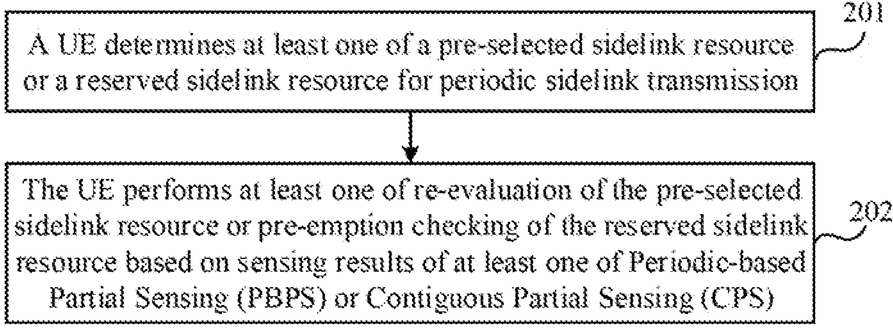
FIG. 2 is a schematic flowchart of a method for sidelink resource re-assessment provided by an embodiment of the present disclosure.

FIG. 2 is a schematic flowchart of a method for sidelink resource re-assessment provided by an embodiment of the present disclosure. As illustrated in FIG. 2, the method for sidelink resource re-assessment includes an operation 201 and an operation 202.

In the operation 201, a UE determines at least one of a pre-selected sidelink resource or a reserved sidelink resource for periodic sidelink transmission.

Herein, the periodic sidelink transmission is defined by a resource reservation interval set to non-zero. In other words, the periodic sidelink transmission has the resource reservation interval (or resource reservation periodicity) set to non-zero, i.e., $$P_{rsvp\_TX} \neq 0.$$

In the embodiment of the present disclosure, the number of pre-selected sidelink resources may be one or more, and the one or more pre-selected sidelink resources may be referred to as a pre-selected resource set. Similarly, the number of reserved sidelink resources may be one or more, and the one or more reserved sidelink resources may be referred to as a reserved resource set.

Herein, the pre-selected resource set and the reserved resource set include resources selected by the UE during an initial resource selection and within an initial reservation period.

In some embodiments, the UE determines the at least one of the pre-selected sidelink resource or the reserved sidelink resource in the following manner.

The UE receives, at a physical layer of the UE, at least one of a first resource set or a second resource set from a higher layer of the UE. Herein, the first resource set includes the pre-selected resource set, and the second resource set includes the reserved resource set. Herein, the pre-selected resource set includes at least one pre-selected sidelink resource for re-evaluation, and the reserved resource set includes at least one reserved sidelink resource for pre-emption checking.

In some embodiments, the first resource set and the second resource set includes resources selected by the higher layer of the UE during the initial resource selection and within the initial reservation period.

In some embodiments, the pre-selected sidelink resource is a resource which has not been indicated by a prior Sidelink Control Information (SCI) and the reserved sidelink resource set is a resource which has been indicated by a prior SCI.

In some embodiments, the SCI may be transmitted in a Physical Sidelink Control Channel (PSCCH).

In the operation 202, the UE performs at least one of re-evaluation of the pre-selected sidelink resource or pre-emption checking of the reserved sidelink resource based on sensing results of at least one of Periodic-based Partial Sensing (PBPS) or Contiguous Partial Sensing (CPS).

In some embodiments, the UE performs the at least one of the re-evaluation of the pre-selected sidelink resource or the pre-emption checking of the reserved sidelink resource in the following manner.

S1) The UE selects a candidate slot set during an initial resource selection for performing PBPS and initializes a candidate resource set based on the candidate slot set.

Herein, the candidate slot set includes candidate slots, selected by the higher layer of the UE during the initial resource selection and within the initial reservation period, for PBPS.

In some embodiments, the UE initializes the candidate resource set to a remaining candidate slot set, where all or part of candidate slots in the remaining candidate slot set belong to the candidate slot set when the at least one of the re-evaluation of the pre-selected sidelink resource or the pre-emption checking of the reserved sidelink resource is performed during an initial reservation period.

In some embodiments, the UE initializes the candidate resource set to a remaining candidate slot set, where all or part of candidate slots in the remaining candidate slot set belong to candidate slots in the candidate slot set plus an integer multiple of the resource reservation interval when the at least one of the re-evaluation of the pre-selected sidelink resource or the pre-emption checking of the reserved sidelink resource is performed during a non-initial reservation period.

In some embodiments, a start slot corresponding to the remaining candidate slot set is a first slot, a slot index of the first slot being a smallest slot index among slot indexes corresponding to the at least one of the first resource set or the second resource set, and an end slot corresponding to the remaining candidate slot set is a last slot of the candidate slot set.

In some embodiments, the UE initializes the candidate resource set beyond the last slot of the candidate slot set when a number of slots in the remaining candidate slot set or the candidate resource set is less than a first threshold.

In an example, during the initial resource selection within the initial reservation period, the UE selects a set of Y candidate slots (i.e., the candidate slot set) within the remaining Packet Delay Budget (PDB) for Periodic-Based Partial Sensing (PBPS). This means that sensing results of all the corresponding periodic sensing occasions are readily available also for the re-evaluation and/or pre-emption checking purposes if the same set of Y candidate slots is used. As such, these sensing results should be reused as much as possible by initializing the candidate resource set ($S_A$) for re-evaluation and/or pre-emption checking to the set of all single-slot candidate resources starting from the first slot of the remaining Y candidate slots (i.e., the remaining candidate slot set) from the initial resource selection in the initial reservation period. Similarly, when the UE performs at least one of re-evaluation or pre-emption checking in the non-initial reservation period, the candidate resource set ($S_A$) is initialized to the remaining Y candidate slots (i.e., the remaining candidate slots set) that belong to an integer multiple of the resource reservation interval ($P_{rsvp\_TX}$) from the Y candidate slots (i.e., the candidate slot set) selected in the initial reservation period during the initial resource selection and fall within the present reservation period.

It should be noted that in either the initial or non-initial reservation period, the candidate resource set ($S_A$) can be extended beyond the remaining Y candidate slots of up to the remaining PDB or the end of the reservation period if the number of slots in the candidate resource set ($S_A$) or the remaining Y candidate slots (i.e., the remaining candidate slot set) is less than a configured $T_{2min}$ or $Y_{min}$ value, even when the Tx-UE does not have corresponding sensing results (e.g., from PBPS) for the extended slots.

S2) The UE performs the at least one of PBPS or CPS to obtain the sensing results.

Specifically, the UE monitors target slots based on at least one of a Periodic-Based Partial Sensing (PBPS) process or a Contiguous Partial Sensing (CPS) process, to obtain respective sensing results.

In some embodiments, the UE monitors the target slots based on the PBPS process. Specifically, the UE monitors periodic sensing occasions corresponding to the candidate resource set or the remaining candidate slot set according to $f_{y-k\times Preserve}$. Herein, $t_y$ is a slot belonging to the remaining candidate slot set or the candidate resource set, and k and $P_{reserve}$ are the same as the initial resource selection, k represents a time location of a periodic sensing occasion and $P_{reserve}$ represents a resource reservation period.

In an example, for both the initial and non-initial reservation periods, the UE monitors periodic sensing occasions corresponding to the remaining Y candidate slots (i.e., the remaining candidate slot set)/the candidate resource set ($S_A$) for re-evaluation and/or pre-emption checking according to $f_{y-k\times Preserve}$ as per the PBPS process from the initial resource selection procedure, where $t_y$ is a slot belonging to the set of the remaining Y candidate slots/the candidate resource set ($S_A$).

In some embodiments, the UE monitors the target slots based on the CPS process. Specifically, the UE performs Contiguous Partial Sensing (CPS) within a monitoring window. Herein, a start slot of the monitoring window is at least M slots earlier than the first slot and an end slot of the monitoring window is N slots earlier than the first slot, the slot index of the first slot is the smallest slot index among the slot indexes corresponding to the at least one of the first resource set or the second resource set, and M and N are positive integers. Herein, a value of M is 31 by default, unless M is configured by a network with another value. Herein, a value of N is $T_{proc,0}+T_{proc,1}$, and $T_{proc,0}$ and $T_{proc,1}$ have predefined values depending on a sub-carrier spacing. For example, $T_{proc,0}$ is a UE processing time of 1, 2, or 4 slots depending on sub-carrier spacing allowed for performing the re-evaluation and pre-emption checking process, and $T_{proc,1}$ is a UE processing time of 3, 5, 9 or 17 slots depending on sub-carrier spacing allowed for the Tx-UE to prepare PSCCH and Physical Sidelink Shared Channel (PSSCH) for transmission.

S3) The UE excludes, based on the sensing results, one or more resources from the candidate resource set.

Specifically, when the UE determines, based on the sensing results, that the one or more resources in the candidate resources set overlap with at least one resource indicated in a received SCI and a measured Reference Signal Receiving Power (RSRP) for the received SCI is higher than a configured threshold, the UE determines at least one of: the one or more resources have been reserved by the received SCI or the one or more resources have been pre-empted by the received SCI, and excludes the one or more resources from the candidate resource set to obtain a remaining candidate resource set.

In some embodiments, the UE reports, at the physical layer of the UE, the remaining candidate resource set to the higher layer of the UE.

In some embodiments, when a first resource in the pre-selected resource set is no longer part of the remaining candidate resource set, the UE reports, at the physical layer of the UE, re-evaluation of the first resource to the higher layer of the UE; and/or, when a second resource in the reserved resource set is no longer part of the remaining candidate resource set and a physical layer priority value for the sidelink transmission is larger than a priority value in the received SCI, the UE reports, at the physical layer of the UE, pre-emption of the second resource to the higher layer of the UE.

The technical solutions of the embodiments of the present disclosure will be described below with reference to the specific application examples.

Figure 3:
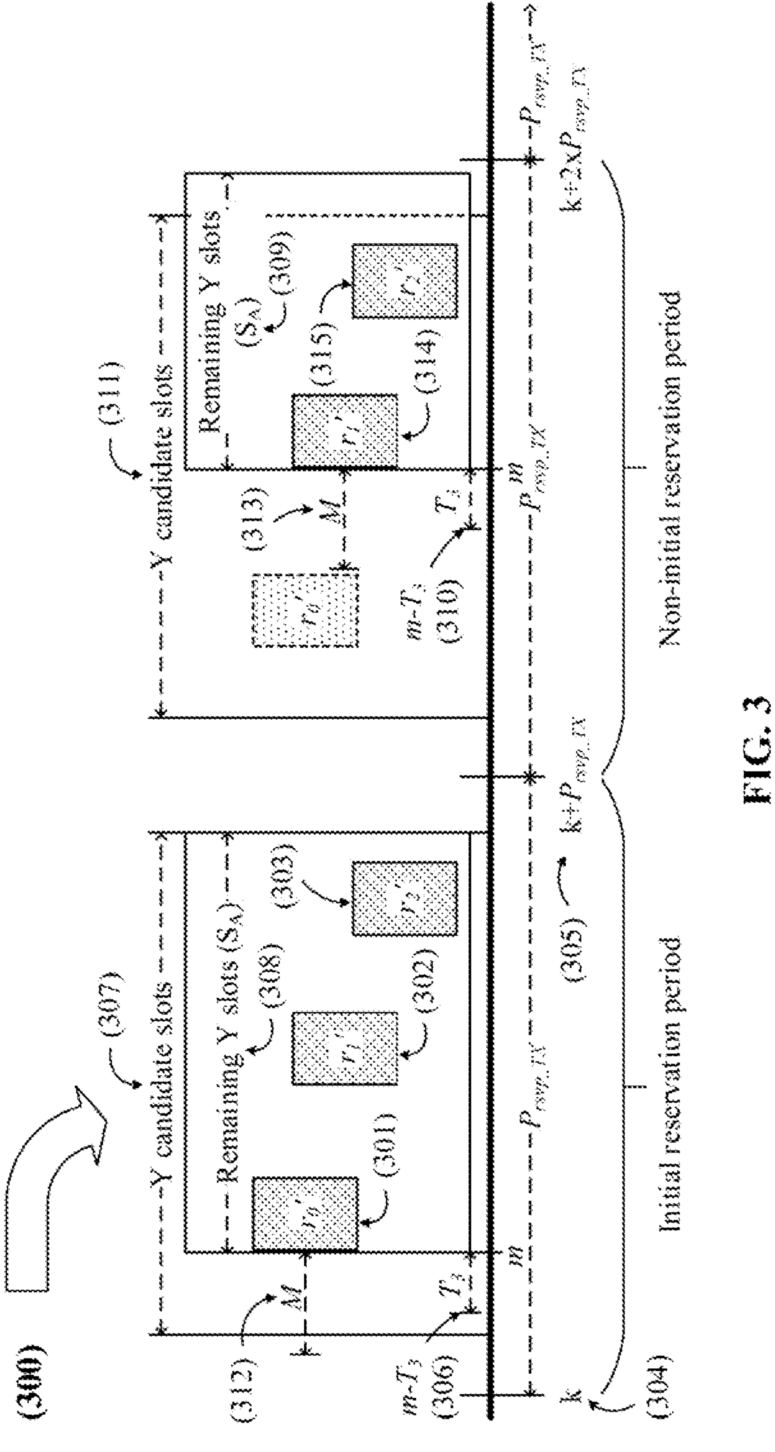
FIG. 3 is a schematic diagram of an application instance provided by an embodiment of the present disclosure.

FIG. 3 is an exemplary illustration of the proposed re-assessment mechanism for periodic reserved sidelink resources provided by an embodiment of the present disclosure For periodic sidelink transmissions with resource reservation periodicity set to none-zero ($P_{rsvp\_TX}\neq 0$), the proposed resource re-assessment method comprises the following functions/steps for re-evaluation and pre-emption checking of sidelink resources. Note that, it is not necessary for a UE to perform these functions/steps according to the following order, in order to implement the proposed resource re-assessment method for re-evaluation and pre-emption checking of sidelink resources.

For a UE layer 1 (L1) receiving a request from its higher layer to perform re-evaluation and pre-emption checking on sidelink resources in a slot n, the higher layer provides a set of pre-selected resources ($r_0$, $r_1$, $r_2$, . . . ) for re-evaluation and a set of reserved resources ($r_0'$, $r_1'$, $r_2'$, . . . ) for pre-emption check, where the pre-selected and reserved resource sets are resources selected by the UE during the initial selection of resources and within the initial reservation period. The difference between a pre-selected ($r_x$) and a reserved resource ($r_x'$) of the UE is in whether the resource has been announced/indicated in a prior Sidelink Control Information (SCI) transmitted in a Physical Sidelink Control Channel (PSCCH).

Initialization of Candidate Resource Set ($S_A$)

In reference to the diagram 300 which depicts the proposed resource re-assessment method of sidelink resources for periodic transmission of sidelink MAC PDUs/transport blocks and is exemplary illustrated in FIG. 3. In the depicted example, only the set of reserved resources ($r_0'$, $r_1'$, $r_2'$) subjected to pre-emption checking in different reservation periods are shown in the diagram 300. The same process/method equally applies to a pre-selected resource set for periodic sidelink transmission. In the diagram 300, let's first denote that the resource set ($r_0'$, $r_1'$, $r_2'$) of 301, 302 and 303 in the initial reservation period were some of the resources selected by the UE during an initial resource selection process, where the initial reservation period starts from the slot k 304 and ends at the slot k+$P_{rsvp\_TX}$ 305, spanning across a resource reservation interval for transmission ($P_{rsvp\_TX}$).

In addition to the said resource set(s), the higher layer may provide one or more of the following information for the re-evaluation and pre-emption checking procedure: the resource pool in which the resources are located, the L1 priority value for the sidelink transmission ($prio_{TX}$), the remaining Packet Delay Budget (PDB), the resource reservation interval ($P_{rsvp\_TX}$).

The timing or slot (n) in which the re-evaluation and pre-emption checking of pre-selected and reserved resource sets is requested/triggered by the higher layer should be just before earliest transmission resource provided by the higher layer. Let's denote the slot (m) be the smallest slot index among the resources from the pre-selected set of resources for re-evaluation ($r_0$, $r_1$, $r_2$, . . . ) and the reserved set of resources for pre-emption checking ($r_0'$, $r_1'$, $r_2'$, . . . ). Then the slot (n) in which the re-evaluation or pre-emption procedure is triggered and to be perform by the UE (L1) should be at $T_3$ before the slot (m), where $T_3$ is a UE processing time of 3, 5, 9 or 17 slots depending on sub-carrier spacing allowed for the UE to prepare PSCCH and Physical Sidelink Shared Channel (PSSCH) for transmission. In reference to the diagram 300, the pre-emption checking slot (n) for the set of reserved resources ($r_0'$, $r_1'$, $r_2'$) would be at m-$T_3$ 306 during the initial reservation period.

During the initial resource selection within the initial reservation period, a set of Y candidate slots 307 was selected within the remaining PDB for Periodic-Based Partial Sensing (PBPS). This means, sensing results of all the corresponding periodic sensing occasions are readily available also for the re-evaluation and pre-emption checking purposes if the same set of Y candidate slots 307 is used. As such, these sensing results should be reused as much as possible by initializing a candidate resource set ($S_A$) for re-evaluation and pre-emption checking to the set of all single-slot candidate resources starting from the slot (m) of the remaining Y candidate slots 308 from the initial resource selection in the initial reservation period.

Similarly, when the UE performs re-evaluation and pre-emption checking in a non-initial reservation period, the candidate resource set ($S_A$) is initialized to the remaining Y candidate slots 309 (starting from the slot m for a re-evaluation and pre-emption checking trigger at m-$T_3$ 310) that belong to an integer multiple of the resource reservation interval ($P_{rsvp\_TX}$) from the Y candidate slots 307 selected in the initial reservation period during the initial resource selection and fall within the present reservation period.

In either the initial or non-initial reservation period, $S_A$ can be extended beyond the remaining Y candidate slots of up to the remaining PDB or the end of the reservation period if the number of slots in $S_A$ or the remaining Y candidate slots is less than a configured $T_{2min}$ or $Y_{min}$ value, even when the UE does not have corresponding sensing results (e.g., from PBPS) for the extended slots.

Periodic-Based Partial Sensing (PBPS)

For both the initial and non-initial reservation periods, the UE monitors periodic sensing occasions corresponding to the remaining Y candidate slots (308, 309)/candidate resource set ($S_A$) for re-evaluation and pre-emption checking according to $t_{y-k \times Preserve}$ as per PBPS process from the initial resource selection procedure, where $t_y$ is a slot belonging to the set of the remaining Y candidate slots (308, 309)/ candidate resource set ($S_A$).

Contiguous Partial Sensing (CPS)

For a triggered/requested re-evaluation and pre-emption checking by the higher layer in either the initial and non-initial reservation periods, the UE performs CPS within a CPS monitoring window [n+$T_A$, n+$T_B$], where n+$T_A$ is at least M logical slots (312, 313) earlier than the slot m, n+$T_B$ is $T_{proc,0}$+$T_{proc,1}$ slots earlier than the slot m, and the slot m is the smallest slot index among the sets of resources provided by the higher layer for re-evaluation ($r_0$, $r_1$, $r_2$, . . . ) and pre-emption checking ($r_0'$, $r_1'$, $r_2'$, . . . ). $T_{proc,0}$ is a UE processing time of 1, 2, or 4 slots depending on sub-carrier spacing allowed for performing the re-evaluation and pre-emption checking process. $T_{proc,1}$ is the same as $T_3$, i.e., a UE processing time of 3, 5, 9 or 17 slots depending on sub-carrier spacing allowed for the UE to prepare PSCCH and PSSCH for transmission. In reference to the diagram 300, it is shown that a resource set ($r_0'$, $r_1'$, $r_2'$) in (301, 302, 303) is provided by the higher layer for pre-emption checking during the initial reservation period and a resource set ($r_1'$, $r_2'$) in (314, 315) is provided by the higher layer for pre-emption checking during the non-initial reservation period. By default, M is 31 unless it is configured with another value. By UE implementation, the UE can monitor more than M slots earlier than the slot m, when M is configured.

Resource Exclusions

A resource is excluded from the initialized candidate resource set ($S_A$) 308 and 309 if it overlaps with a resource indicated in a SCI received among all sensing results (from PBPS and/or CPS) and the measured RSRP for the received SCI is higher than a configured threshold, which is based on the priority of the received SCI ($prio_{RX}$) and the L1 priority of the sidelink transport block for transmission ($prio_{TX}$).

Reporting of Re-Evaluation and Pre-Emption for Resource Re-Selection at Higher Layer The UE reports the remaining candidate resource set ($S_A$) after the resource exclusion to the higher layer.

If a resource ($r_x$) from the higher layer provided sets of resources ($r_0$, $r_1$, $r_2$, . . . ) is no longer part of the remaining resource set ($S_A$) after the resource exclusion, meaning the resource has been reserved by a received SCI, the UE reports re-evaluation of the resource ($r_x$) to the higher layer for resource re-selection.

Similarly, if a resource ($r_x'$) from the higher layer provided sets of resources ($r_0'$, $r_1'$, $r_2'$, . . . ) is no longer part of the remaining resource set ($S_A$) after the resource exclusion, meaning the resource has been pre-empted by a received SCI, and the L1 priority value for the sidelink transmission ($prio_{TX}$) is larger than the priority value in the received SCI ($prio_{RX}$), the UE reports pre-emption of resource ($r_x'$) to the higher layer for resource re-selection.

The preferred embodiments of the present disclosure have been described in detail above with reference to the accompanying drawings. However, the present disclosure is not limited to the specific details of the above embodiments. Within the scope of the technical concept of the present disclosure, various simple modifications can be made to the technical solutions of the present disclosure, and these simple modifications all belong to the scope of protection of the present disclosure. For example, the various specific technical features described in the above specific embodiments may be combined in any suitable manner without contradiction, and various possible combinations are not further described in the present disclosure in order to avoid unnecessary repetition. For another example, any combination may be made between the various embodiments of the present disclosure so long as it does not depart from the idea of the present disclosure and should also be regarded as the contents disclosed in the present disclosure. For another example, on the premise of no conflict, each embodiment described in the present disclosure and/or the technical features in each embodiment can be arbitrarily combined with the prior art, and the technical solution obtained after combination should also fall within the scope of protection of the present disclosure.

It should also be understood that in the various method embodiments of the present disclosure, the size of the sequence numbers of the above-mentioned processes does not mean the order of execution, and the execution order of the processes should be determined by their functions and inherent logic, and should not constitute any limitation on the implementation processes of the embodiments of the present disclosure. Additionally, in embodiments of the present disclosure, The terms "downlink", "uplink" and "sidelink" are used to indicate the transmission directions of signals or data, where "downlink" is used to indicate that the transmission direction of the signal or data is the first direction transmitted from the station to the user equipment of the cell, "uplink" is used to indicate that the transmission direction of the signal or data is the second direction transmitted from the user equipment of the cell to the station, and "sidelink" is used to indicate that the transmission direction of the signal or data is the third direction transmitted from the user equipment 1 to the user equipment 2. For example, "downlink signal" means that the transmission direction of the signal is the first direction. In addition, in embodiments of the present disclosure, the term "and/or" is only an association relationship describing associated objects, indicating that three relationships may exist. Specifically, A and/or B can represent three situations: A exists alone, A and B exist at the same time, and B exists alone. In addition, the character "/" here usually represents that previous and next associated objects form an "or" relationship.

Figure 4:
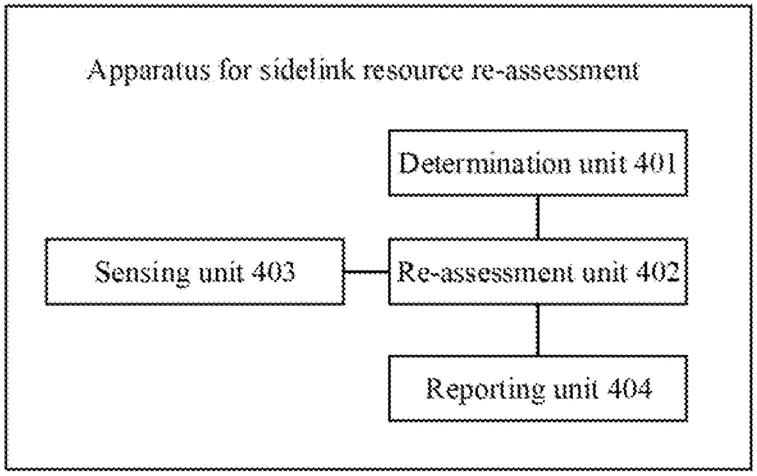
FIG. 4 is a schematic structural diagram of an apparatus for sidelink resource re-assessment provided by an embodiment of the present disclosure.

FIG. 4 is a schematic structural diagram of an apparatus for sidelink resource re-assessment provided by an embodiment of the present disclosure. The apparatus for sidelink resource re-assessment is for use in a UE. As illustrated in FIG. 4, the apparatus for sidelink resource re-assessment includes a determination unit 401 and a re-assessment unit 402.

The determination unit 401 is configured to determine at least one of a pre-selected sidelink resource or a reserved sidelink resource for periodic sidelink transmission.

The re-assessment unit 402 is configured to perform at least one of re-evaluation of the pre-selected sidelink resource or pre-emption checking of the reserved sidelink resource based on sensing results of at least one of Periodic-based Partial Sensing (PBPS) or Contiguous Partial Sensing (CPS). Here, the periodic sidelink transmission is defined by a resource reservation interval set to non-zero.

In some embodiments, the determination unit 401 is configured to receive, at a physical layer of the UE, at least one of a first resource set or a second resource set from a higher layer of the UE. Here, the first resource set includes a pre-selected resource set, the second resource set includes a reserved resource set, the pre-selected resource set includes at least one pre-selected sidelink resource for re-evaluation, and the reserved resource set includes at least one reserved sidelink resource for pre-emption checking. Here, the pre-selected sidelink resource is a resource which has not been indicated by a prior Sidelink Control Information (SCI) and the reserved sidelink resource is a resource which has been indicated by a prior SCI.

In some embodiments, the determination unit 401 is configured to select a candidate slot set during an initial resource selection for performing PBPS, and initialize a candidate resource set based on the candidate slot set.

The apparatus further includes a sensing unit 403, configured to perform the at least one of PBPS or CPS to obtain the sensing results.

The re-assessment unit 402 is configured to exclude, based on the sensing results, one or more resources from the candidate resource set.

In some embodiments, the determination unit 401 is configured to initialize the candidate resource set to a remaining candidate slot set, where all or part of candidate slots in the remaining candidate slot set belong to the candidate slot set when the at least one of the re-evaluation of the pre-selected sidelink resource or the pre-emption checking of the reserved sidelink resource is performed during an initial reservation period.

In some embodiments, the determination unit 401 is configured to initialize the candidate resource set to a remaining candidate slot set, where all or part of candidate slots in the remaining candidate slot set belong to candidate slots in the candidate slot set plus an integer multiple of the resource reservation interval when the at least one of the re-evaluation of the pre-selected sidelink resource or the pre-emption checking of the reserved sidelink resource is performed during a non-initial reservation period.

In some embodiments, a start slot corresponding to the remaining candidate slot set is a first slot, a slot index of the first slot being a smallest slot index among slot indexes corresponding to the at least one of the first resource set or the second resource set, and an end slot corresponding to the remaining candidate slot set is a last slot of the candidate slot set.

In some embodiments, the determination unit 401 is configured to initialize the candidate resource set beyond the last slot of the candidate slot set when a number of slots in the remaining candidate slot set or the candidate resource set is less than a first threshold.

In some embodiments, the sensing unit 403 is configured to monitor target slots based on at least one of a PBPS process or a CPS process, to obtain respective sensing results.

In some embodiments, the sensing unit 403 is configured to monitor periodic sensing occasions corresponding to the candidate resource set or the remaining candidate slot set according to $f_{y-k\times Preserve}$. Here, $t_y$ is a slot belonging to the remaining candidate slot set or the candidate resource set, and k and $P_{reserve}$ are the same as the initial resource selection. Here, k represents a time location of a periodic sensing occasion and $P_{reserve}$ represents a resource reservation period.

In some embodiments, the sensing unit is configured to perform CPS within a monitoring window. Here, a start slot of the monitoring window is at least M slots earlier than a first slot and an end slot of the monitoring window is N slots earlier than the first slot, a slot index of the first slot is a smallest slot index among slot indexes corresponding to the at least one of the first resource set or the second resource set, and M and N are positive integers.

In some embodiments, a value of M is 31 by default, unless M is configured by a network with another value.

In some embodiments, a value of N is $T_{proc,0}+T_{proc,1}$, and $T_{proc,0}$ and $T_{proc,1}$ have predefined values depending on a sub-carrier spacing.

In some embodiments, the re-assessment unit 402 is configured to, when it is determined based on the sensing results that the one or more resources in the candidate resources set overlap with at least one resource indicated in a received SCI and a measured Reference Signal Receiving Power (RSRP) for the received SCI is higher than a configured threshold, determine at least one of: the one or more resources have been reserved by the received SCI or the one or more resources have been pre-empted by the received SCI, and exclude the one or more resources from the candidate resource set to obtain a remaining candidate resource set.

In some embodiments, the apparatus further includes a reporting unit 404.

The reporting unit 404 is configured to report, at the physical layer of the UE, the remaining candidate resource set to the higher layer of the UE.

In some embodiments, the reporting unit 404 is configured to perform at least one of: when a first resource in the pre-selected resource set is no longer part of the remaining candidate resource set, reporting, at the physical layer of the UE, re-evaluation of the first resource to the higher layer of the UE; or, when a second resource in the reserved resource set is no longer part of the remaining candidate resource set and a physical layer priority value for the sidelink transmission is larger than a priority value in the received SCI, reporting, at the physical layer of the UE, pre-emption of the second resource to the higher layer of the UE.

It should be understood by those skilled in the art that the related description of the apparatus for sidelink resource re-assessment in the embodiments of the present disclosure can be understood with reference to the related description of the method for sidelink resource re-assessment in the embodiments of the present disclosure.

Figure 5:
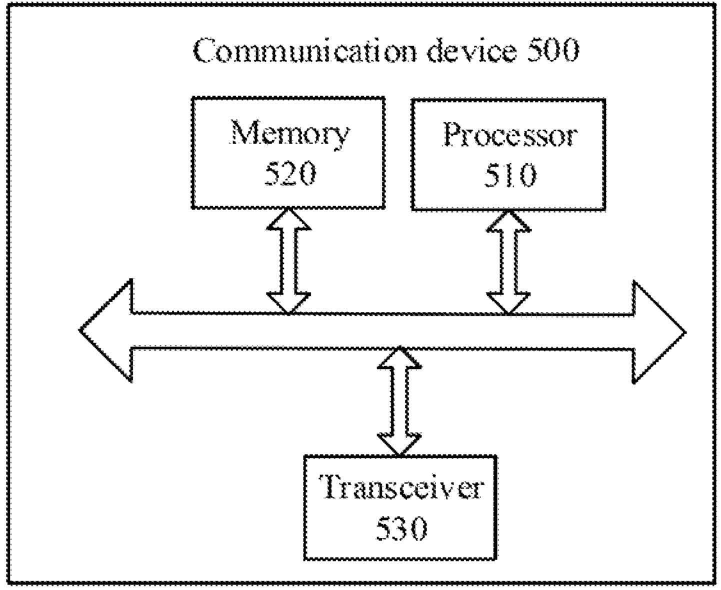
FIG. 5 is a schematic structural diagram of a communication device provided by an embodiment of the present disclosure.

FIG. 5 is a schematic structural diagram of a communication device 500 provided by an embodiment of the present disclosure. The communication device may be a UE. As illustrated in FIG. 5, the communication device 500 includes a processor 510 configured to call and execute a computer program in a memory to perform the methods in the embodiments of the present disclosure.

Optionally, as illustrated in FIG. 5, the communication device 500 further includes a memory 520. Herein, the processor 510 is configured to call and execute a computer program in the memory 520 to perform the methods in the embodiments of the present disclosure.

Herein, the memory 520 may be a separate device independent of the processor 510, or may be integrated in the processor 510.

Optionally, as illustrated in FIG. 5, the communication device 500 further includes a transceiver 530. The processor 510 is configured to control the transceiver 530 to communicate with another device, specifically, to transmit information or data to another device or receive information or data from another device.

Herein, the transceiver 530 may include a transmitter and a receiver. The transceiver 530 may further include antenna (s), and the number of antennas may be one or more.

Specifically, the communication device 500 may be the UE in the embodiments of the present disclosure, and the communication device 500 may implement the corresponding processes implemented by the UE in each method of the embodiments of the present disclosure, which will not be repeated here for brevity.

Figure 6:
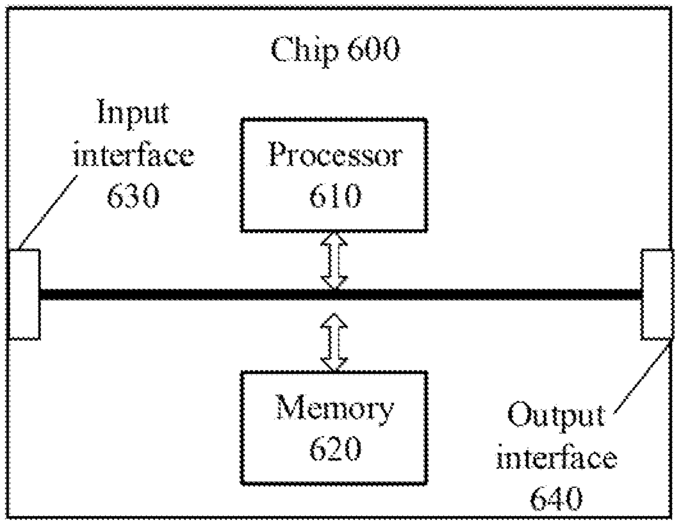
FIG. 6 is a schematic structural diagram of a chip provided by an embodiment of the present disclosure.

FIG. 6 is a schematic structural diagram of a chip provided by an embodiment of the present disclosure. As illustrated in FIG. 6, the chip 600 includes a processor 610 configured to call and execute a computer program in a memory to perform the methods in the embodiments of the present disclosure.

Optionally, as illustrated in FIG. 6, the chip 600 further includes a memory 620. Herein, the processor 610 is configured to call and execute a computer program in the memory 620 to perform the methods in the embodiments of the present disclosure.

Herein, the memory 620 may be a separate device independent of the processor 610, or may be integrated in the processor 610.

Optionally, the chip 600 further includes an input interface 630. Herein, the processor 610 is configured to control the input interface 630 to communicate with another device or chip, specifically, to acquire information or data from another device or chip.

Optionally, the chip 600 further includes an output interface 640. Herein, the processor 610 is configured to control the output interface 640 to communicate with another device or chip, specifically, to output information or data to another device or chip.

The chip may be applied to the UE in the embodiments of the present disclosure, and the chip may implement the corresponding processes implemented by the UE in each method of the embodiments of the present disclosure, which will not be repeated here for brevity.

It should be understood that the chip in the embodiments of the present disclosure may also be referred to as a system-level-chip, a system chip, a chip system, or a system-on-chip, or the like.

It should be understood that the processor in the embodiments of the present disclosure may be an integrated circuit chip and has a signal processing capability. In an implementation process, each operation in the method embodiments may be completed by an integrated logical circuit in a hardware form in the processor or an instruction in a software form. The processor may be a general purpose processor, a Digital Signal Processor (DSP), an Application Specific Integrated Circuit (ASIC), a Field Programmable Gate Array (FPGA) or another programmable logical device, a discrete gate or transistor logical device, or discrete hardware component. Each method, operation and logical block diagram disclosed in the embodiments of the present disclosure may be implemented or executed. The general purpose processor may be a microprocessor or may be any conventional processor or the like. The operations in the methods disclosed in combination with the embodiments of the present disclosure may be directly embodied to be executed and completed by a hardware decoding processor, or executed and completed by a combination of hardware in the decoding processor and software modules. The software module may be located in a mature storage medium in this field such as a Random Access Memory (RAM), a flash memory, a Read-Only Memory (ROM), a Programmable ROM (PROM) or Electrically Erasable PROM (EEPROM) and a register and the like. The storage medium is located in a memory, and the processor reads information in the memory and completes the operations in the methods in combination with the hardware thereof.

It may be understood that the memory in the embodiments of the present disclosure may be a volatile memory or a nonvolatile memory, or may include both the volatile and nonvolatile memories. Herein, the nonvolatile memory may be a ROM, a PROM, an Erasable PROM (EPROM), an EEPROM or a flash memory. The volatile memory may be an RAM, and is used as an external high-speed cache. By way of illustration but not limitation, RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It should be noted that the memory in a system and method described in the present disclosure is intended to include, but not limited to, memories of these and any other proper types.

It should be understood that the memory described above is exemplary but not limiting. For example, the memory in the embodiments of the present disclosure may also be an SRAM, a DRAM, an SDRAM, a DDR SDRAM, an ESDRAM, an SLDRAM and a DR RAM and the like. That is, the memory in the embodiments of the present disclosure is intended to include, but not limited to, memories of these and any other proper types.

The embodiments of the present disclosure also provide a computer-readable storage medium, which is configured to store a computer program. The computer-readable storage medium may be applied to a UE in the embodiments of the present disclosure, and the computer program enables a computer to execute corresponding flows implemented by the UE in each method in the embodiments of the present disclosure. For simplicity, elaborations are omitted herein.

The embodiments of the present disclosure also provide a computer program product, which includes computer program instructions. The computer program product may be applied to a UE in the embodiments of the present disclosure, and the computer program instructions enable a computer to execute corresponding flows implemented by the UE in each method in the embodiments of the present disclosure. For simplicity, elaborations are omitted herein.

The embodiments of the present disclosure also provide a computer program. The computer program may be applied to a UE in the embodiments of the present disclosure, and the computer program, when being executed on a computer, enables the computer to execute corresponding flows implemented by the UE in each method in the embodiments of the present disclosure. For simplicity, elaborations are omitted herein.

Those of ordinary skill in the art may realize that the units and algorithm operations of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the present disclosure.

Those skilled in the art may clearly learn about that for specific working processes of the system, device and unit described above, the reference may be made to the corresponding processes in the method embodiments and will not be elaborated herein for convenient and brief description.

In some embodiments provided by the present disclosure, it is to be understood that the disclosed system, device and method may be implemented in other manners. For example, the device embodiments described above are only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of devices or the units, and may be electrical, mechanical or adopt other forms.

The units described as separate parts may or may not be physically separated, and parts displayed as units may or may not be physical units, and namely may be located in the same place, or may also be distributed to multiple network units. Part or all of the units may be selected according to practical requirements, to achieve the purpose of the solutions in the embodiments.

In addition, each functional unit in each embodiment of the present disclosure may be integrated into a processing unit, or each unit may physically exist independently, or two or more than two units may be integrated into a unit.

When being realized in form of software functional unit and sold or used as an independent product, the function may be stored in a computer-readable storage medium. Based on such understanding, the technical solutions of the present disclosure in essence or the part of the technical solutions of the present disclosure that contributes to the prior art or the part of the technical solutions of the present disclosure can be embodied in the form of a software product. The computer software product is stored in a storage medium, and includes several instructions to cause a computer device (which may be a personal computer, a server, or a network device or the like) to execute all or part of the operations of the methods described in the embodiments of the present disclosure. The storage medium includes a U disk, a mobile hard disk, a ROM, a RAM, a magnetic disk, an optical disk or other media capable of storing program codes.

Described above are merely specific embodiments of the present disclosure. However, the scope of protection of the present disclosure is not limited thereto. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

The invention claimed is:

1. A method for sidelink resource re-assessment, comprising:

determining, by User Equipment (UE), at least one of a pre-selected sidelink resource or a reserved sidelink resource for periodic sidelink transmission; and performing, by the UE, at least one of re-evaluation of the pre-selected sidelink resource or pre-emption checking of the reserved sidelink resource based on sensing results of at least one of Periodic-based Partial Sensing (PBPS) or Contiguous Partial Sensing (CPS);

wherein the periodic sidelink transmission is defined by a resource reservation interval set to non-zero, wherein determining, by the UE, the at least one of the pre-selected sidelink resource or the reserved sidelink resource comprises:

receiving, by the UE at a physical layer of the UE, at least one of a first resource set or a second resource set from a higher layer of the UE, the first resource set comprising a pre-selected resource set, the second resource set comprising a reserved resource set, the pre-selected resource set comprising at least one pre-selected sidelink resource for re-evaluation, and the reserved resource set comprising at least one reserved sidelink resource for pre-emption checking; wherein the pre-selected sidelink resource is a resource which has not been indicated by a prior Sidelink Control Information (SCI) and the reserved sidelink resource is a resource which has been indicated by a prior SCI, wherein performing, by the UE, the at least one of the re-evaluation of the pre-selected sidelink resource or the pre-emption checking of the reserved sidelink resource based on the sensing results of the at least one of PBPS or CPS comprises:

selecting, by the UE, a candidate slot set during an initial resource selection for performing PBPS and initializing a candidate resource set based on the candidate slot set:

performing, by the UE, the at least one of PBPS or CPS to obtain the sensing results; and excluding, by the UE, one or more resources from the candidate resource set based on the sensing results, wherein selecting, by the UE, the candidate slot set during the initial resource selection for performing PBPS and initializing the candidate resource set based on the candidate slot set comprises:

initializing, by the UE, the candidate resource set to a remaining candidate slot set, wherein all or part of candidate slots in the remaining candidate slot set belong to the candidate slot set when the at least one of the re-evaluation of the pre-selected sidelink resource or the pre-emption checking of the reserved sidelink resource is performed during an initial reservation period; or initializing, by the UE, the candidate resource set to a remaining candidate slot set, wherein all or part of candidate slots in the remaining candidate slot set belong to candidate slots in the candidate slot set plus an integer multiple of the resource reservation interval when the at least one of the re-evaluation of the pre-selected sidelink resource or the pre-emption checking of the reserved sidelink resource is performed during a non-initial reservation period, wherein a start slot corresponding to the remaining candidate slot set is a first slot, a slot index of the first slot being a smallest slot index among slot indexes corresponding to the at least one of the first resource set or the second resource set, and an end slot corresponding to the remaining candidate slot set is a last slot of the candidate slot set.

2. The method of claim 1, wherein performing, by the UE, the at least one of PBPS or CPS to obtain the sensing results comprises:

monitoring, by the UE, target slots based on at least one of a PBPS process or a CPS process, to obtain respective sensing results.

3. The method of claim 2, wherein monitoring, by the UE, the target slots based on the PBPS process comprises:

monitoring, by the UE, periodic sensing occasions corresponding to the candidate resource set or the remaining candidate slot set according to ty-k×Preserve, wherein ty is a slot belonging to the remaining candidate slot set or the candidate resource set, and k and Preserve are the same as the initial resource selection, k representing a time location of a periodic sensing occasion and Preserve representing a resource reservation period.

4. The method of claim 2, wherein monitoring, by the UE, the target slots based on the CPS process comprises:

performing, by the UE, CPS within a monitoring window, wherein a start slot of the monitoring window is at least M slots earlier than a first slot and an end slot of the monitoring window is N slots earlier than the first slot, a slot index of the first slot being a smallest slot index among slot indexes corresponding to the at least one of the first resource set or the second resource set, and M and N being positive integers.

5. The method of claim 4, wherein a value of M is 31 by default, or M is configured by a network with another value.

6. The method of claim 4, wherein a value of N is $T_{proc,0}+T_{proc,1}$, and $T_{proc,0}$ and $T_{proc,1}$ have predefined values depending on a sub-carrier spacing.

7. The method of claim 1, wherein excluding, by the UE, the one or more resources from the candidate resource set based on the sensing results comprises:

when the UE determines, based on the sensing results, that the one or more resources in the candidate resources set overlap with at least one resource indicated in a received SCI and a measured Reference Signal Receiving Power (RSRP) for the received SCI is higher than a configured threshold, determining, by the UE, at least one of: the one or more resources have been reserved by the received SCI or the one or more resources have been pre-empted by the received SCI, and excluding the one or more resources from the candidate resource set to obtain a remaining candidate resource set.

8. The method of claim 7, further comprising:

reporting, by the UE at the physical layer of the UE, the remaining candidate resource set to the higher layer of the UE.

9. The method of claim 1, wherein when a number of slots in the remaining candidate slot set or the candidate resource set is less than a first threshold, the candidate resource set is initialized beyond a last slot of the candidate slot set.

10. User Equipment (UE), comprising a processor and a memory, wherein the memory is configured to store a computer program; and the processor is configured to call and execute the computer program stored in the memory, to control the UE to perform:

determining at least one of a pre-selected sidelink resource or a reserved sidelink resource for periodic sidelink transmission; and performing at least one of re-evaluation of the pre-selected sidelink resource or pre-emption checking of the reserved sidelink resource based on sensing results of at least one of Periodic-based Partial Sensing (PBPS) or Contiguous Partial Sensing (CPS);

wherein the periodic sidelink transmission is defined by a resource reservation interval set to non-zero, wherein the processor is further configured to call and execute the computer program stored in the memory, to control the UE to perform:

receiving, at a physical layer of the UE, at least one of a first resource set or a second resource set from a higher layer of the UE, the first resource set comprising a pre-selected resource set, the second resource set comprising a reserved resource set, the pre-selected resource set comprising at least one pre-selected sidelink resource for re-evaluation, and the reserved resource set comprising at least one reserved sidelink resource for pre-emption checking; wherein the pre-selected sidelink resource is a resource which has not been indicated by a prior Sidelink Control Information (SCI) and the reserved sidelink resource is a resource which has been indicated by a prior SCI, wherein the processor is further configured to call and execute the computer program stored in the memory, to control the UE to perform:

selecting a candidate slot set during an initial resource selection for performing PBPS and initializeing a candidate resource set based on the candidate slot set;

performing the at least one of PBPS or CPS to obtain the sensing results; and excluding, based on the sensing results, one or more resources from the candidate resource set, wherein the processor is further configured to call and execute the computer program stored in the memory, to control the UE to perform:

initializing the candidate resource set to a remaining candidate slot set, wherein all or part of candidate slots in the remaining candidate slot set belong to the candidate slot set when the at least one of the re-evaluation of the pre-selected sidelink resource or the pre-emption checking of the reserved sidelink resource is performed during an initial reservation period; or initializing the candidate resource set to a remaining candidate slot set, wherein all or part of candidate slots in the remaining candidate slot set belong to candidate slots in the candidate slot set plus an integer multiple of the resource reservation interval when the at least one of the re-evaluation of the pre-selected sidelink resource or the pre-emption checking of the reserved sidelink resource is performed during a non-initial reservation period, wherein a start slot corresponding to the remaining candidate slot set is a first slot, a slot index of the first slot being a smallest slot index among slot indexes corresponding to the at least one of the first resource set or the second resource set, and an end slot corresponding to the remaining candidate slot set is a last slot of the candidate slot set.

11. The UE of claim 10, wherein the processor is further configured to call and execute the computer program stored in the memory, to control the UE to perform:

when it is determined based on the sensing results that the one or more resources in the candidate resource set overlap with at least one resource indicated in a received SCI and a measured Reference Signal Receiving Power (RSRP) for the received SCI is higher than a configured threshold, determining at least one of: the one or more resources have been reserved by the received SCI or the one or more resources have been pre-empted by the received SCI, and excluding the one or more resources from the candidate resource set to obtain a remaining candidate resource set.

12. The UE of claim 11, wherein the processor is further configured to call and execute the computer program stored in the memory, to control the UE to perform:

reporting, at the physical layer of the UE, the remaining candidate resource set to the higher layer of the UE.

13. The UE of claim 12, wherein the processor is further configured to call and execute the computer program stored in the memory, to control the UE to perform at least one of:

when a first resource in the pre-selected resource set is no longer part of the remaining candidate resource set, reporting, at the physical layer of the UE, re-evaluation of the first resource to the higher layer of the UE; or when a second resource in the reserved resource set is no longer part of the remaining candidate resource set and a physical layer priority value for the sidelink transmission is larger than a priority value in the received SCI, reporting, at the physical layer of the UE, pre-emption of the second resource to the higher layer of the UE.

14. The UE of claim 10, wherein the processor is further configured to call and execute the computer program stored in the memory, to control the UE to perform:

monitoring target slots based on at least one of a PBPS process or a CPS process, to obtain respective sensing results.

15. The UE of claim 14, wherein the processor is further configured to call and execute the computer program stored in the memory, to control the UE to perform:

monitoring periodic sensing occasions corresponding to the candidate resource set or the remaining candidate slot set according to ty-k×Preserve, wherein ty is a slot belonging to the remaining candidate slot set or the candidate resource set, and k and Preserve are the same as the initial resource selection, k representing a time location of a periodic sensing occasion and Preserve representing a resource reservation period.

16. The UE of claim 14, wherein the processor is further configured to call and execute the computer program stored in the memory, to control the UE to perform:

performing CPS within a monitoring window, wherein a start slot of the monitoring window is at least M slots earlier than a first slot and an end slot of the monitoring window is N slots earlier than the first slot, a slot index of the first slot being a smallest slot index among slot indexes corresponding to the at least one of the first resource set or the second resource set, and M and N being positive integers.

17. The UE of claim 16, wherein a value of M is 31 by default, or M is configured by a network with another value.

18. The UE of claim 16, wherein a value of N is $T_{proc,0}+T_{proc,1}$, and $T_{proc,0}$ and $T_{proc,1}$ have predefined values depending on a sub-carrier spacing.

19. The UE of claim 10, wherein when a number of slots in the remaining candidate slot set or the candidate resource set is less than a first threshold, the candidate resource set is initialized beyond a last slot of the candidate slot set.

20. A non-transitory computer-readable storage medium, storing a computer program that, when executed by a computer, causes the computer to perform:

determining at least one of a pre-selected sidelink resource or a reserved sidelink resource for periodic sidelink transmission; and performing at least one of re-evaluation of the pre-selected sidelink resource or pre-emption checking of the reserved sidelink resource based on sensing results of at least one of Periodic-based Partial Sensing (PBPS) or Contiguous Partial Sensing (CPS);

wherein the periodic sidelink transmission is defined by a resource reservation interval set to non-zero, wherein determining the at least one of the pre-selected sidelink resource or the reserved sidelink resource comprises:

receiving, at a physical layer of the computer, at least one of a first resource set or a second resource set from a higher layer of the computer, the first resource set comprising a pre-selected resource set, the second resource set comprising a reserved resource set, the pre-selected resource set comprising at least one pre-selected sidelink resource for re-evaluation, and the reserved resource set comprising at least one reserved sidelink resource for pre-emption checking; wherein the pre-selected sidelink resource is a resource which has not been indicated by a prior Sidelink Control Information (SCI) and the reserved sidelink resource is a resource which has been indicated by a prior SCI, wherein performing the at least one of the re-evaluation of the pre-selected sidelink resource or the pre-emption checking of the reserved sidelink resource based on the sensing results of the at least one of PBPS or CPS comprises:

selecting a candidate slot set during an initial resource selection for performing PBPS and initializing a candidate resource set based on the candidate slot set;

performing the at least one of PBPS or CPS to obtain the sensing results; and excluding one or more resources from the candidate resource set based on the sensing results, wherein selecting the candidate slot set during the initial resource selection for performing PBPS and initializing the candidate resource set based on the candidate slot set comprises:

initializing the candidate resource set to a remaining candidate slot set, wherein all or part of candidate slots in the remaining candidate slot set belong to the candidate slot set when the at least one of the re-evaluation of the pre-selected sidelink resource or the pre-emption checking of the reserved sidelink resource is performed during an initial reservation period; or initializing the candidate resource set to a remaining candidate slot set, wherein all or part of candidate slots in the remaining candidate slot set belong to candidate slots in the candidate slot set plus an integer multiple of the resource reservation interval when the at least one of the re-evaluation of the pre-selected sidelink resource or the pre-emption checking of the reserved sidelink resource is performed during a non-initial reservation period, wherein a start slot corresponding to the remaining candidate slot set is a first slot, a slot index of the first slot being a smallest slot index among slot indexes corresponding to the at least one of the first resource set or the second resource set, and an end slot corresponding to the remaining candidate slot set is a last slot of the candidate slot set.

* * * * *